United States Patent
Robinson

(10) Patent No.: US 8,150,724 B1
(45) Date of Patent: *Apr. 3, 2012

(54) SYSTEM FOR ELICITING ACCURATE JUDGEMENT OF ENTERTAINMENT ITEMS

(75) Inventor: Gary Robinson, Bangor, ME (US)

(73) Assignee: Emergent Discovery LLC, Portland, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/939,402

(22) Filed: Nov. 4, 2010

Related U.S. Application Data

(63) Continuation-in-part of application No. 11/423,577, filed on Jun. 12, 2006, now Pat. No. 7,860,741, which is a continuation of application No. 09/714,789, filed on Nov. 16, 2000, now Pat. No. 7,072,846.

(60) Provisional application No. 60/165,794, filed on Nov. 16, 1999, provisional application No. 61/280,434, filed on Nov. 4, 2009.

(51) Int. Cl.
*G06Q 10/00* (2006.01)

(52) U.S. Cl. .................... 705/7.31; 705/7.32

(58) Field of Classification Search ............ 705/7.31, 705/7.32
See application file for complete search history.

(56) References Cited

U.S. PATENT DOCUMENTS

| | | | |
|---|---|---|---|
| 5,583,763 A | 12/1996 | Atcheson et al. |
| 5,749,081 A | 5/1998 | Whiteis |
| 5,754,939 A | 5/1998 | Herz et al. |
| 5,790,426 A | 8/1998 | Robinson |
| 5,798,785 A | 8/1998 | Hendricks et al. |
| 5,872,850 A | 2/1999 | Klein et al. |
| 5,884,282 A | 3/1999 | Robinson |
| 5,918,014 A | 6/1999 | Robinson |
| 5,963,916 A | 10/1999 | Kaplan |
| 6,029,161 A | 2/2000 | Lang et al. |
| 6,041,311 A | 3/2000 | Chislenko et al. |
| 6,049,777 A | 4/2000 | Sheena et al. |
| 6,064,980 A | 5/2000 | Jacobi et al. |
| 6,260,033 B1 | 7/2001 | Tatsuoka |
| 6,327,590 B1 | 12/2001 | Chidlovskii et al. |
| 6,421,675 B1 | 7/2002 | Ryan et al. |
| 6,438,579 B1 | 8/2002 | Hosken |
| 6,460,036 B1 | 10/2002 | Herz |
| 6,564,202 B1 | 5/2003 | Schuetze et al. |
| 6,681,247 B1 | 1/2004 | Payton |
| 6,757,691 B1 | 6/2004 | Welsh et al. |
| 6,963,850 B1 | 11/2005 | Bezos et al. |
| 6,985,694 B1 | 1/2006 | De Bonet et al. |
| 2003/0014759 A1 | 1/2003 | Van Stam |
| 2003/0191753 A1 | 10/2003 | Hoch |

OTHER PUBLICATIONS

Steinbach, Michael, George Karypis, and Vipin Kumar. "A Comparison of Document Clustering Techniques", Department of computer Science and Engineering, University of Minnesota, Technical Report, no date.

Good, Nathaniel; Shafer, J. Ben; Konstan, Joseph A.; Borchers, Al; Sarwar, Badrul; Herlocker, Jon; Riedl, John. Combining Collaborative Filtering with Personal Agents for Better Recommendations. GroupLens Research Project. University of Minnesota. 1999.

N. Tishby, F.C. Periera, W. Bialek; "The Information Bottleneck Method"; Proc. of the 37th Annual Allerton Conference on Communication, Control, and Computing, 1999, pp. 368-377.

Tyson, J.; "How The Old Napster Worked"; downloaded Sep. 29, 2004 from http://computer.howstuffworks.com/napster.htm/printable.

Shardanand, Upendra. Social Information Filtering for Music Recommendations, Massachusetts Institute of Technology, Sep. 1994.

Shardanand, Upendra; Maes, Patti. Social Information Filtering: Algorithms for Automating "World of Mouth", Mit, Chi '95 Proceedings Papers.

*Primary Examiner* — Johnna Loftis

(74) *Attorney, Agent, or Firm* — Gerry J. Elman; Elman Technology Law, P.C.

(57) ABSTRACT

The invention elicits reliable ratings of entertainment items. Appropriate users are identified to supply ratings, and they are motivated to supply reliable ones by rewards. The identification of appropriate users is based on taste signatures of the items to be rated and of the users. Other products of user effort such as reviews are also elicited.

2 Claims, No Drawings

SYSTEM FOR ELICITING ACCURATE JUDGEMENT OF ENTERTAINMENT ITEMS

CROSS REFERENCE TO RELATED APPLICATIONS

This application is a continuation in part of U.S. patent application Ser. No. 11/423,577, filed Jun. 12, 2006 (now U.S. Pat. No. 7,860,741 B1), which is a continuation of U.S. patent application Ser. No. 09/714,789, filed Nov. 16, 2000 now U.S. Pat. No. 7,072,846, which claims priority under 35 U.S.C. Section 119(e) from U.S. Provisional Patent Application 60/165,794, filed Nov. 16, 1999. The entire disclosure thereof of the above-enumerated United States Patent documents, including the specifications, drawings, claims, and abstracts, are considered as being part of the disclosure of this application and are hereby incorporated by reference. In addition, under 35 U.S.C. Section 119(e), this application claims priority to and incorporates by reference the entire disclosure of U.S. Provisional Patent Application 61/280,434, filed Nov. 4, 2009.

A portion of the disclosure of this patent document contains material which is subject to copyright protection. The copyright owner has no objection to the facsimile reproduction by anyone of the patent disclosure, as it appears in the PTO patent file or records, but otherwise reserves all copyrights whatsoever.

BRIEF SUMMARY OF THE INVENTION

The purpose of this invention is to facilitate the existence and rapid growth of a Web site (or other form of electronic service) that will distribute entertainment works to their audience more effectively than other techniques.

Online services based on this invention will

Enable artists and entertainers to more efficiently find the consumers who will most enjoy their works.

Enable consumers to more efficiently find artists and entertainers they will enjoy.

(In some embodiments) Enable consumers of similar tastes to enjoy discussions with each other, and, in some embodiments, to interact with artists.

(In some embodiments) Enable individuals to play an entrepreneurial role in connecting artists to their audience, wherein they may be paid for their success.

(In some embodiments) Enable consumers and artists to enjoy the benefits of group buying: more sales to the artist and lower cost to the consumer.

DETAILED DESCRIPTION OF THE INVENTION

Clusters: The Heart of The Invention

The centerpiece of this invention is clusters of users who have similar tastes. Users are enabled to find cluster that match their tastes, and artists are enabled to find the clusters where the users are who are likely to be interested in their work. Clusters thus serve as hubs of activity for particular tastes; in most embodiments ratings of items of interest to those tastes can be viewed, and various embodiments include various means for inter-user communication so that communities of people with similar tastes are formed.

Much of this disclosure will focus on music applications of the invention. However, this is merely for convenience, and applications to other fields, including works in the fields of writing and movies, fall equally within the scope of the invention.

User-Created Clusters

In the some embodiment individuals are enabled to create new clusters whenever they choose. One reason for doing so is that they believe that there is a group of people which is not adequately served by any of the existing clusters—for instance, because the tastes of people of this group are substantially different from the tastes represented by any of the existing clusters. The person creation a cluster will be known in this description as the "cluster initiator".

Means are provided for cluster creators to specify a taste of the cluster (which in some embodiments is later combined with taste information from other users as described elsewhere in this document). In one embodiment, he does so by specifying ratings for various items which he feels will be useful in defining the taste of the cluster. For example, he might give a recording of Bob Dylan's a rating of 0.95 (on a scale of 0 to 1) and a recording of Handel's Water Music a 0.1.

In another embodiment, he simply inputs a list of items which he feels will be the ones most-liked by members of the cluster. In many cases, these will represent his personal most-liked items. In a preferred embodiment, this list is ordered according to how well each item is liked relative to the others on the list.

Some software and network systems such as Napster and Gnutella enable file sharing, where files stored in the user's computer are made available for other users to download to their own computers. Usually, the songs a user has on his computer—and thus can make available for sharing—correspond to songs the user likes. Thus, the list of files he makes available for download can usually be presumed to represent a list of his likes, and used that way in computations. In some cases, of course, users will make songs they don't like available to other users, but some embodiments view this as happening infrequently enough that such problems may be ignored.

Then when users of the system are looking for a cluster that might be suitable for them, their tastes will be compared to that of this cluster as well as the old clusters. This new one may be the most suitable for a meaningful number of people.

In preferred embodiments, each cluster will have associated with it various facilities such as threaded discussion groups, chat, instant messaging, etc. These facilities will keep the users interested and motivate them to spend more time online. Spending this time online will provide more opportunities for advertising as well as more commitment to the cluster, increasing the probability of further online purchasing.

In some embodiments individuals are responsible for "moderating" and "administrating" these various facilities. This group may contain the cluster initiator. In many cases one person will play all these roles. For convenience, this person or group will be referred to here as the "cluster administrator."

Means are provided in such embodiments such that administrators, visitors, and members can provide reviews of items such as CD's which are in the subject domain of the service. In some embodiments, only a subset of these classes of users are enabled to input reviews; for instance, administrators and members.

When an item has more than one review, the usefulness of the system is enhanced by means of presenting the reviews to users in an optimal order. In the preferred embodiment, this order is based on the similarity between the user reading reviews and the user who wrote a particular review. Reviews written by authors who are closer to the reader appear earlier in the list.

Alternatively, the order can be dependent on the similarity of the author and the tastes of the cluster through which the item's reviews have been accessed.

In addition, in some embodiments means are provided for users to rate reviews. The system can use these ratings to determine the quality of a reviewer in general and/or the degree to which each individual user likes a particular reviewer. These factors can be used together with the similarity data, or in some embodiments, without it, to determine an ordering of reviews. For example, in one embodiment orderings are generated separately based on taste and quality. Percentile rankings are then calculated for each review. The percentiles between the two lists are averaged, and a new ordered list is created based on these average percentiles.

In some embodiments a summary of each reviewer's perceived goodness (determined by means of ratings or passive data acquisition such as measuring the average time spent reading a reviewer's reviews or the relative number of times a reviewer's reviews are sought out) is displayed.

Particular embodiments can use any means to combine the above factors. For instance, geometric or arithmetic averages can be computed, with or without weights.

In some embodiments, only a limited number of reviews are presented to users. These may be the ones that would have been presented first based on the ordering techniques described above. In some embodiments where only the "best" reviews are presented, the order in which those reviews are presented may be in date-of-creation or another order such as random.

In some embodiments, reviews are automatically (or optionally) posted to the Usenet or other publicly-available services with links back to the cluster service or the individual cluster through which the review was written. (In some embodiments, however, there is no particular association between reviews and individual clusters; rather the association is with the item or artist being reviewed, so that all reviews are available in all clusters.)

In some embodiments means are provided so the administrators are paid by users for access to their clusters. In various embodiments, these payments are one-time-only, per time period (such as monthly) or per access. Reviewers can be paid similarly for access to reviews written by that reviewer. Credit card payment mechanisms or other techniques such as micropayments can be used.

In addition, in some embodiments facilities are provided for purchasing items directly through the site (or through partner sites reached by hyperlink). In some embodiments means are provided for users to rate their satisfaction with such purchases, and in preferred embodiments display means are provided for users to see selected summaries of these ratings, such as the average rating for the cluster (including average ratings for reviews, product purchases, general satisfaction, and any other metric of cluster success).

In embodiments where users are enabled to purchase items, preferred embodiments include means for the one or more of the cluster administrators to be paid a portion of the purchase price of the items. In various embodiments, this is a fixed percentage, a percentage that various with volume or total revenues, or other variations.

In some embodiments advertising is used as an additional income stream.

In some embodiments, means are provided to enable a "group purchase" to be made wherein a number of users will purchase an item at once, thereby getting a lower price from the provider for the item. For instance, in some embodiments, means are provided for users to indicate that they would be willing to buy an item at a particular price. When enough users are willing to buy at a particular discounted price that the provider is willing to sell the item at that price, the transaction is carried through. In other embodiments, data is stored regarding the number of people who, having purchased an item by a particular artist in the past, and/or having reviewed or rated an artist at a particular level, were willing to buy a discounted item when such a deal was presented to them. This enables the system to predict an estimate of how many people are likely to buy a particular item by the same artist if offered at a discount. This enables the administrator to purchase a substantial number of copies at the item at once, at a discount, and to pass all or part of the savings on to purchasers. In some embodiments the software is able to automatically email all members of a cluster of such deals, or to screen its output to those who have bought items from that artist or very similar artists previously.

In some embodiments, users are able to provide ratings of clusters. However, in preferred embodiments, more weight is given to ratings from people whose ratings have higher calculated "representativeness." (The concept of representativeness is discussed elsewhere in this document.)

Automatically-Created Clusters

In preferred embodiments, automatically-created clusters exist instead of or in addition to user-created clusters. Note that some embodiments have the automatically-created cluster features described in this section along with a limited number of the other features of the invention which are described in this disclosure, or none of them. Automatically-created clusters have their own value independent of the other concepts described herein.

A technique for optimizing clusters based upon the principles of Shannon entropy will be described. Other techniques may be similarly applicable and also fall within the scope of the invention.

Appendix B contains instructions for creating clusters that maximize information transfer as that concept is described in the literature of Shannon entropy. The related Hartley information approach also contains information transfer calculations, and falls within the scope of the invention, but the Shannon approach is preferred.

For completeness, Appendix C gives the Python source code to a methodology that does not use information transfer. It is based upon the standard k-means clustering concept. This example is included to illustrate the wide range of clustering approaches that fall within the scope of the invention; however, the preferred embodiment uses Shannon entropy's information transfer calculations.

This disclosure uses the term "Automatically-Created" to refer not only to systems in which clusters are created by software without manual human intervention, but also to systems in which clusters are optimized by software.

In embodiments where clusters are actually created by the software, a preferred methodology is for the administrator to set the average number of songs desired per cluster. As new songs are added to the system, new clusters are automatically created such that the average number of songs remains approximately the same; the optimization process then populates the cluster. These clusters, in various embodiments, may start out empty before they are optimized, or may be initially populated with new songs or randomly chosen songs.

In order for the software to have data to base its optimizations on, user taste data must be collected. Some embodiments do this by means of allowing users to rate songs. Preferred embodiments do this by means of passive data collection. For instances, *.mp3 searches on the Gnutella network cause server to respond with a list of songs the user has made available for file sharing, which can be assumed, without too much error, to be a list of songs liked by that person.

Radio UserLand does even better, broadcasting every song played by every user, allowing us to build a more detailed taste profile in a completely passive way. Various embodiments use various such means for data collection.

Some embodiments only allow recommendations or cluster information to be sent to processes that send realistic-seeming user data to the server. (For instance, most such embodiments would consider a process that continuously reports playing the same song to be unrealistic.)

One challenge is to associate data sent by particular processes with user indentifiers that users can use to log on to Web sites. Preferred embodiments accomplish that by noting the IP address the user is accessing the Web site from, and seeing what passive data source, such as a Gnutella server, exists at the same IP address. In most such embodiments the user is then asked, via the Web interface, to confirm that he is using the type of data-broadcasting process that he is apparently using and asked whether the system has permission to link that data to his Web logon ID (or cookie, or other persistent identifier). In some embodiments, such as those involving passive data collection through Radio UserLand, a publicly available user ID for the data broadcaster is available, and that same user ID can be subsequently used by the user to log on to the Web site; the server can then easily link the data.

Distributed Processing for Automatically-Created Clusters

Preferred embodiments provide means for the computational load of the cluster calculations to be spread across more than one central processing unit.

In some embodiments, this is accomplished by having completely independent processes running on the various machines which all interact with the data as stored in a database system such as the open-source InterBase product. Each process randomly chooses a song, then finds the optimal cluster to move it to. If, when it is ready to perform the move, a check in the database indicates that another process has already moved it, then it cancels the move; otherwise it updates the database. In embodiments where more than one write needs to be performed against the database to facilitate the move, these actions are normally put into a single transaction. Using this procedure, a large number of computers can work together to perform the optimization more quickly. However, a portion of the work done will be wasted because the song in question was already moved by another process. This portion will be greater as the number of processes grows. Therefore it is preferable to have a more centrally controlled model.

Embodiments with centrally controlled models need an interprocess communication (IPC) method. Preferred embodiments use open standards such as XML-RPC and SOAP, since these enable clients to be written independently using a any of variety of programming languages. In some such embodiments, a server process waits for registration messages from remote client processes. When a client initializes itself, it communicates with the IP address and port of the server process. The client logs on with a persistent logon ID, or the server gives it a session ID when it first makes contact. Then a portion of the workload is assigned to the client.

Various embodiments use various methodologies for portioning out parts of the work to the various clients. In one such embodiment, the client is sent all data needed to describe all the clusters via IPC. Then, it is assigned responsibility for a certain number of songs. It finds the best clusters for those songs. It sends that data back to the server, which subsequently updates the database. At various intervals, the cluster description data is sent again to the client, containing the results of the simultaneous work done by the various other clients.

In some other embodiments, only the data for a subset of the clusters is sent to the client. Therefore, a set of clients is responsible for any particular song. Each client determines the best destination among the clusters it has the data for. Then the degree of goodness of the best choice is returned to the server by each client; the server determines "the best of the best" and updates the database accordingly.

One danger that arises in distributed processing embodiments is that a malicious client will be created that interacts with the server exactly as if it were a legitimate client. To avert this problem, preferred embodiments keep track of the average improvement in cluster quality per song movement. (For instance, in embodiments based on information transfer, this is based on the improvement in information transfer that occurs due to the movement.) When a client suggests a movement, the improvement associated with that movement is calculated by the server. If a client's suggestions tend to involve significantly less improvement in quality than is the norm, the system has reason to believe the client was either not written correctly or may even be malicious (trying to move songs inappropriately for the benefit of specific individuals or organizations).

The preferred embodiment accomplishes this by first storing the improvement per movement for trusted clients. These may be, for instance, clients running on the same machine as the server, under control of the system administrator. As the client sends suggested movements to the server, the server determines whether the client is to be trusted.

In the preferred embodiment, a client's suggestions are not added to the database until the client has had a chance to prove itself. The server waits until it receives 100 suggestions. The average improvement is calculated. This average needs to be within a desired range relative to the trusted average; for instance, an installation might desire that the client's average must be within 10% of the trusted value. If it is not, that batch of 100 suggestions is thrown away. Each batch of 100 suggestions is tested separately, in case a malicious client tries to fool the server by being "nice" for a while, followed by malicious behavior.

Other embodiments use other techniques for screening out malicious clients. In one such technique, the value of the last 100 suggestions is averaged for each client, and the clients are subsequently ranked from least valuable to most valuable. These rankings are updated whenever new suggestions come in from a client. The last 100 suggestions from the lowest-ranking 5% (or some other number) are always ignored. Still other embodiments calculate a Bayesian estimator of the value of the next suggestion. The suggestion is counted if and only if the Bayesian estimator is within a specified range compared to the trusted client, for instance, within 1%. Other techniques are used in still further embodiments.

One particularly simple approach, used in some embodiments, is for the server to simply check that the preferred embodiment increases overall information transfer.

In some embodiments where there are so many clients that the central server does not have the processing power to check on all the clients, some clients are assigned with the task of checking that other clients are not malicious. In most such embodiments, the central server assigns these checking tasks in such a way that the assigned checking client is unknown to the possible malicious client, so there is no way for the clients to collude to trick the server.

Human Input with Automatically-Created Clusters

Preferred embodiments do not rely only on software optimization of clusters. They allow users to suggest changes. These are only made if they result in an improvement to the clustering.

For example, in one such embodiments, a Web page is made available where all the songs in a cluster are listed with checkboxes beside them. (If there are too many songs in a cluster to fit on one page, multiple pages are used. Most search engines such as Google provide fine examples of how to manage a list output when the list takes more than one page.)

There is also an entry area whether user can enter an identifier for the destination cluster. In various embodiments, an identifying number of name may be entered, or there may be a pull down list if the number of clusters is small, or a more elaborate search mechanism is used.

The user checks some of the checkboxes, specifies the destination, and indicates he is ready to continue (for instance, there may be a Continue button).

The system then determines whether the suggested movement would improve the overall clustering. For instance, in embodiments which use information transfer to measure cluster quality, the information transfer that would result if the move were completed is calculated. If it is an improvement, the transfer goes through. Otherwise, it does not, and the user is informed that the transfer didn't go through. Preferred embodiments then let the user make adjustments to his suggestion; for instance, the song listing may be presented again with the checkboxes in the state the user left them in. He can then make alterations and click Continue again.

In preferred embodiments, the user can create a new cluster as the proposed destination. It would then be initially populated with the songs he selects, if doing so increases the quality of the clustering. Many such embodiments provide a user interface whereby the user can enter songs to populate the new cluster with, without regard to there original clusters. In most such embodiments the administrator can set an upper limit on the number of clusters that may be created in this way.

The embodiments discussed here thus join human input with computer optimization in such a way that the human input is smoothly integrated into the process. All accepted human input furthers the aim of improving the clustering.

Names for Automatically-Created Clusters

Preferred embodiments provide input means for users to name automatically-created clusters.

In one such embodiments, a page is presented in which there are 20 text input areas, each providing enough space to enter a name. When a name is entered into one of the text areas (and Submit is clicked), the name may not be removed except by an administrator for a period of one week. Next to each name is a set of radio boxes labeled "no opinion, poor, fair, good, excellent". Users can thus rate any or all of the names. User identification is carried out by means of a logon requirement, cookies, or other means; only 1 vote per user per name is allowed.

An overall rating for each name is determined by means of averaging the ratings, ignoring "no opinion" ratings.

After a name has been displayed for one week, if it is not among the top 50%, it is deleted, and any user can enter a new name.

Only one name per user at a time is accepted in the list.

At any point in time, the highest-rated name is used as the name of the cluster, displayed wherever it is convenient to display such a name. In many embodiments a cluster number is also displayed, which is constant over the life time of the cluster, and therefore may be useful when a reliable way of identifying a cluster is needed.

User-Cluster-Similarity

In most embodiments, means are provided to compute a similarity between a user and a cluster.

In the some embodiments, users provide ratings that represent their tastes. In other embodiments purchase histories are used. In other embodiments, "passive" data collection such as tracking the artists and recordings that are downloaded and/or listened to can be used. In general, any source of information which captures the user's preferences in the target domain is acceptable; this includes taking note of the music files made available for Napster, Gnutella, or other types of file sharing.

In some embodiments, the "taste of the cluster," its "taste signature," is defined wholly by the administrator; in others it is defined by the members or even the visitors to the cluster, or by a combination thereof. The taste signature is stored in a database on the server. In some embodiments it takes the form of a list of artists or items considered to be "liked" by the cluster; in some embodiments this list is ordered with the most-liked items appearing at the top; in some embodiments ratings are associated with items and artists, for instance, on a scale from "excellent" to "poor".

In each of these embodiments, where data from various users are combined to form the taste signature, appropriate means are used. For instance, where ratings are used, the ratings for various items and artists are averaged; in some such embodiments, a weighted average is used with the administrator having a greater weight than other users. In embodiments where ordered lists are used, means for combining include converting the lists to percentile rankings, averaging the percentile rankings for each album, and outputting a new ordered list in order of the averaged percentiles.

When a users wants to make use of the system, he usually does so by finding clusters of taste similar to theirs and, in preferred embodiments, with other positive characteristics.

In preferred embodiments, means are provided to display a list of clusters together with descriptions of each cluster supplied by the administrator. These descriptions, in various embodiments take the form of text descriptors such as "Jazz, with a focus on old-style Dixieland", categories such as "Jazz", "Garage Rock", etc. or other means of communicating the center of the cluster.

In preferred embodiments, means are provided to search for clusters which users can believe they will be interested in. In embodiments where categories are provided, users can pick a category. In some embodiments where text descriptions are provided, users can search through these descriptions using standard text-retrieval techniques in order to find clusters relevant to their tastes.

In preferred embodiments, users can specify their personal tastes, and the system automatically lists clusters where the taste signature of the cluster is near to the taste signature of the user.

In preferred embodiments, when lists of clusters are presented based on any of the search techniques mentioned above, or other search techniques, the attributes mentioned above such as category and similarity to the user viewing the list are displayed, as may other cluster attributes which apply to the given cluster.

In some embodiments, "passive" data collection methods are used in matching clusters to users. These methods involve no special input of data indicating tastes.

In some such embodiments in the field of music, customizable Internet "radio" stations are associated with some or all clusters. Such stations play a mix of recordings using TCP/IP, multicasting, and/or other protocols to send streaming audio data (with additional video in some cases) to the user's computer where it is converted into sound. The recordings which are of the most interest to a cluster will tend to be played most often; the recording of least interest to the cluster, while still being "liked" by the cluster, will be played least often. Play rates can be used to tabulate ranks for items. In some embodiments, rank data is compiled for artists instead of, or in addition to, items. In most such embodiments, the administrator determines the play lists and relative frequency of playing various artists and cuts.

This rank data is then used for searching, whether acquired through manual user action or passively. In some embodiments, users input their favorite artists (or recordings, depending on the embodiment) in order of preference. In one embodiment, rank correlation is then used to find the closest matches, by computing the rank correlation for each cluster in turn and then picking the ones with the greatest level of correlation. In preferred embodiments, further processing is done to calculate p-values relative to the rank correlations, and the p-values closest to 0 indicate the closest match. (This is preferable because p-values seamlessly incorporate the number of artists or items in common on the lists being matched, as well as the degree of similar ordering.)

In other embodiments, other means are used to measure taste similarities based on this data. In some embodiments, for instance, rank data is converted into "ratings" data by dividing the rankings into groups and considering the items (or artists) in the group of highest ranks to have the highest rating, the items (or artists) in the $2^{nd}$-highest group of ranks to have the second-highest rating, etc. (There are an equal number of groups of ranks to the number of ratings; for instance, if there is a 5-point rating scale, one embodiment would assign the top 20% of items [or artists] to the highest rating, the next 20% to the next highest rating, etc.) Then rating-based techniques such as those described in U.S. Pat. No. 5,884,282 for measuring similarity are used.

In some embodiments, other types of data than rank or ratings data are used. For instance, in some embodiments, simple counts of the number of items (or artists) in common on the two lists are used; a higher number means more similarity of taste. It should not be construed that this invention depends on the use of any particular type of this "taste signature" data.

For example, the taste signature may be based upon a digital analysis of the acoustic properties of one or more tracks associated with an artist (such as rhythm and loudness) or on classifications such as genre.

In embodiments where we have only "presence/absence" data available, such as a Napster file list in which a particular song is either present or absent, a variety of calculations can be used. While the invention should not be construed to be limited to any particular calculations, several will be listed for purposes of example: the Ochiai, Dice, and Jaccard indices. In calculating these indices, some embodiments consider the entire list of songs to be the combination of all songs contained in either the cluster in question or the user's liked list. The presence and absence are determined corresponding to this expanded list. Some other embodiments consider the master list to be the list of songs liked by the user; other songs are ignored. Thus in such embodiments the user only has "presence" indicated; whereas the cluster will usually have a mix of presence and absence. Other embodiments do the reverse, taking the cluster's list to be the master list. Some embodiments further calculate statistical significances with respect to such indices, by making use of the statistical distribution of the used index (Snijders 1990). In all these cases a number is calculated which corresponds to the degree to which the user's list of songs matches the clusters' list of songs.

In some embodiments, passive data collection is done on the user side, in addition to, or instead of, doing so on the cluster side. In some embodiments, for example, use is made of the fact that users often have MP3, CD, streaming audio, or other types of music players on their machines. Such players can be adapted by their programmers (and, in the case of open-source players, by any competent programmer) to store playback-based taste-signature data similar to that described for customizable Internet radio stations. In some embodiments this data is stored on the user's computer; in others it is stored on a central server. As noted earlier, lists of files made available for Napster, Gnutella, or other file sharing may be used. As before, rank correlation or other means, depending upon the embodiment, are used to determine the most appropriate clusters.

In some further embodiments, recommendations generated by clusters are integrated directly into the user interfaces of the users' players. For example, in some embodiments the software residing on the server is sent the playback data for a user, finds the most appropriate cluster, and sends the player software a list of the most highly-rated recordings. These recommendations are made available to the user (in one embodiment, by means of a pull-down menu; in another, by means of a scrolling list; in other embodiments, by other means) and the user can then choose the one he wants to hear. In various embodiments additional information may be included in the display, such as the name of the artist, the length of the song, etc.; in some embodiments, it is possible to click on a feature and be transported to a World Wide Web page with information on the recording.

In some embodiments, the user's player is sent the taste signature data associated with the various clusters and makes the decision about which cluster is most appropriate. This lessens privacy concerns because no complete record of a given individual's tastes needs to exist on the server to facilitate the recommendation process.

In some embodiments, the methods described here and other methods are used to measure similarities between individual users. For instance, in some embodiments these similarities are used to determine the order in which a user views reviews written by other users; the ones by users with the most similarity to the user reading the reviews are displayed first.

Cluster Membership

In preferred embodiments, users can become members of clusters. In some embodiments, members of clusters are given special access to certain facilities like chat rooms and discussion boards. In some embodiments they are given special pricing considerations when making purchases.

In typical embodiments, cluster members are known to the system by a logon ID and password. Members can join a cluster they are visiting by indicating that they wish to join; in some embodiments this is accomplished by checking an HTML checkbox.

Goodness List

In preferred embodiments, a goodness list is associated with each cluster. This somewhat corresponds to the top-40 song lists from decades ago.

Because a typical system might have hundreds or even thousands of clusters, the goodness list associated with each cluster will be highly targeted to particular tastes.

In some embodiments, manually entered ratings, supplied by the users, are averaged or otherwise combined to form the goodness score, and songs are listed in order of score.

In preferred embodiments, the necessary data is collected passively. In preferred embodiments, this data includes the number of times each user plays each song. Players or file sharing processes communicate their passively collected data to the server by using such common interfaces as SOAP, XML-RPC, or others.

At the time this disclosure is being written Radio UserLand broadcasts this data for its users by means of XML and any process that wants access to it can do get it by reading an XML file at a particular IP address. Radio UserLand broadcasts the time each song is played by each user; this data can be compiled to obtain a frequency of playing for each song.

Preferred embodiments use such data as follows. For each user:

The number of times he has played each song in the last week (or during some other chosen time period) is computed. (Over the entire population, this results in one count per user per song.)

Songs he has not played during that period are ignored in all following steps.

The user's played songs are ranked with respect to one another according to the number of plays.

A number between 0 and 1 is assigned depending on rank, in increments of 1/N, where N is the number of songs played at least once by the user. The most frequently played song has a ranking of 1, the least, a rank of 1/N. We will call these "unit ranks"

Then, for each song:

The geometric mean of the unit ranks is computed. This is done by multiplying the unit ranks, and computing the Mth root of the product, where M is the number of unit ranks that were multiplied. This geometric mean is considered to be the "goodness" of the song.

The number computed for each song as described above has two main advantages over other known approaches:

Because of the ranking process, a particular user who tries to maliciously skew the process by playing a particular song an overwhelmingly huge number of times does not end up having any greater effect than another user who played the song only a little more frequently than other songs.

By using the geometric mean to compute the goodness, the songs with the highest goodness values are the songs that most consistently achieve high play rates among users who have heard them. This consistency is important, because our aim is to create a goodness list that is very reliable. Ideally, a top-ranked song in the goodness list of a cluster will be very likely to appeal to everyone who feels an association to that cluster. Geometric means accomplish that aim.

Some embodiments take the geometric mean methodology a further step, and treat the ranks as p-values. These p-values are with respect to the null hypothesis that the song has no particular tendency to be ranked above average compared to other songs. Then, the product of these p-values has an approximately chi-square distribution with 2M degrees of freedom. So, instead of taking the Mth root, we use the chi-square distribution to calculate a resultant "combined" confidence level, represented by another p-value. This resultant p-value can then be used as the goodness. Under this goodness measurement, the songs with the highest goodness would be even more reliably liked by a user with an affinity for the cluster than using the geometric mean method.

The problem with the chi-square method is that songs with a lot of people hearing them tend to generate better confidence levels, because there is more data to generate confidence from. This prejudices that goodness measure against new songs that few people have heard, even if they play the song extremely frequently.

However, in some embodiments, it is still considered worthwhile to display the chi-square-based goodness, to be as confident as possible that the top-ranked songs will be liked by nearly anyone who hears them, even though some even better newer songs will not get the attention they deserve.

In some embodiments, more than one goodness list is displayed, usually along with text describing the advantages and disadvantages of each one. For instance, once such embodiment displays the chi-square-based list with the heading "Old Reliable—You'll Be Sure To Like The Top Listed Ones Here!" and displays the geometric-mean-based ones with the heading: "Hottest of the Hot—The Top Ones Tend To Be Newer Songs Loved By Everyone Who's Heard Them!"

Some embodiments display other measures, some of which are more akin to traditional popularity measures, such as ranking the songs according to the number of people who have heard each one or the total number of plays it has received. Some embodiments display such numbers with the data restricted to users associated with the cluster; some do so over the entire population. Any combination of measures can be displayed.

In general, any measure that conveys the degree to which a song is popular or liked can be used.

These measures are often most valuable when the input data is restricted to members of the cluster for which they are being displayed. For instance, someone who loves serious, literary folk music may dislike all disco music. If for some reason he downloads a disco song and plays it once, he probably wouldn't play it again. But that should not cause the song to have a low goodness in lists that are displayed in a cluster that appeals to disco lovers.

Note that in some embodiments, there is no time window for the data to be considered by these calculations; in others older data is given less weight according to a decreasing scale, such as using half-life calculations for the data based upon the exponential distribution. (Given a chosen half-life, such as 30 days, one can compute the decay for any point in time using the exponential distribution. For our example, 30 days would have a decay of 0.5; days less than 30 would have decay values between 1 and 0.5; days greater than 30 would have decay values between 0.5 and 0.)

This decay is an appropriate weight for the data points. If arithmetic averaging is used, the decay for each ranking is multiplied by the unit ranking. If geometric averaging is used, the unit ranking is used as a power for the ranking. Other decreasing scales may also be used. Different lists may have different scales. For instance, an "Old Reliable" list may have a window of one year, or include all relevant data ever collected, and a "Hottest of the Hot" list for the same cluster may have a window of one week.

Radio

In some embodiments each cluster broadcasts its songs as many services on the Web broadcast songs using such formats as streaming mp3 and Real Audio. In some embodiments the administrator of a cluster can turn this feature on or off for a given cluster.

All-You-Can-Eat Services

At the time of writing of this disclosure, many people in the Internet industry believe that a time will come when users will be able to access any song they want at any time, and either download it or play it in a streaming manner. Napster enables anyone to download any of a very great number of songs at any time for no charge, but its legality is in question because record companies and artists are not being reimbursed. It is generally expected in the industry that paid services will shortly come into existence that give users similar benefits as those provided by Napster today, but legally. It is usually envisioned that a flat fee will be involved, akin to a monthly cable television bill. Cable TV is all-you-can-eat in the sense that for one fixed fee, the consumer gets to watch as much TV as he wants. The expected network-based music services are expected to also be all-you-can-eat in the sense that users can have access to as much music as they want for a fixed fee.

A marketplace may evolve in which artists charge such services different amounts based on their popularity. A relatively unknown artist might charge less than a better-known artist.

The service described in this disclosure can, in such a marketplace, be of use to all-you-can-eat services because the goodness measures can be used to determine who is good, regardless of the present popularity. Thus, an all-you-can-eat service can save money by marketing relatively unknown, but good, artists to its users; the more the users choose to download or listen to lesser-known artists, the more the service saves.

One of ordinary skill in the art will readily see how to implement this class of embodiments. However, for exemplary purposes, a small number of examples will be given.

In some such embodiments, the plurality of ratings for an item, generated by different raters, are combined by any reasonable means (such as weighted or unweighted arithmetic or geometric averages), and a cutoff point for combined ratings is set, below which an artist (or item) is not considered to be good enough to be marketed in an all-you-can-eat service, regardless of the lower-than-usual associated cost.

In further such embodiments, the combined rating is used together with taste signature data, gathered from the clusters associated with the raters and combined together, such that the all-you-can-eat service can market artists (or items) with acceptable combined ratings to users who have individual taste signatures that are consistent with those combined taste signatures. The combining operation can use, for example, the same techniques described elsewhere in this specification to combine taste information for multiple users into a cluster taste signature.

It must not be construed that the scope of the invention is limited to the described rating or taste signature combining techniques.

The all-you-can-eat service may be at a physically distinct location (or multiple locations) and managed by a different corporation than the service that collected the ratings. This enables one organization, which elicits the ratings, to serve multiple all-you-can-eat services. Various common architectures such as REST or XML-RPC can be used to communicate between the services.

Recommendations

In some cases, users will not want to have to think about clusters. They will simply want recommendations of songs.

Elsewhere in this disclosure means of measuring user-cluster-similarity are discussed. Recommendations are then made, in some embodiments, by finding the cluster(s) most similar to the user, and recommending the best songs in those clusters, according to the goodness measure used by the particular embodiment.

For instance, in some such embodiments, means such as the Ochiai presence/absence index are used to calculate a user-cluster similarity number where a higher value means more similarity, and a goodness calculation within each cluster is also performed, such as using the geometric mean of unit ranks, where a higher value means more goodness. The two numbers are then multiplied; we will call the result the recommendation priority. Recommendations are subsequently made in descending order of the recommendation priority.

If it is desired to give more weight to one of these factors, it can be taken to a power. The power can be tuned over time. One way to do that is to try different values, assigning each value for a significant period of time, such as a month. The more appropriate the power, the higher the following number will be: The average of (the recommendation priority times some passive or active measure of how much the user likes the song). For instance, in embodiments involving Radio UserLand, for each recommended song that the user has not heard before, we multiply the number of times the user actually plays it in the first week after receiving the recommendation by its recommendation priority, and compute the average of those numbers. The higher that average is, the better the weight is. After trying a number of weights over a period of time, the best one is chosen.

Other ways of combining the two numbers for calculating the recommendation priority are used in various other embodiments, such as adding them; and in still further embodiments, other methods are used, such as only picking one cluster for recommendations and then ordering them by goodness.

Artist Tools

Items may be submitted by artists for examination by cluster administrators, possibly leading to ratings, reviews, or other consideration. In some embodiments special forms, such as Web form input, are provided for this purpose.

In preferred embodiments, means are provided to give artists some control over their "persistent reputations" as determined by ratings and reviews. In some such embodiments artists are given means to specify the clusters that may request or display reviews and ratings of their works. In further embodiments, clusters that cannot display or request reviews for an artist cannot receive submissions from him.

In order to assist artists in directing their submissions to appropriate clusters, preferred embodiments provide special tools. Preferred embodiments use taste-based searching. In one such embodiment, a form (such as a Web input form) is provided which allows an artist to list similar artists. The clusters with most-liked-lists with the most artists in common with the artists' list are the best ones to submit to. In a further embodiment, these similar artists are listed in order of similarity. The rankings are then matched against the cluster's rankings on their ranked most-liked-lists using rank correlation. In still another embodiment, artists rate other artists regarding their similarity, and the cluster stores ratings of artist according to their perceived goodness. The scale may be for instance, a 7-point scale from "Excellent" to "Fair" in each case; although in one case similarity to a given artist is measured and in another case "goodness" seems to be measured, in fact the "goodness" measure is really similarity to the tastes of the given cluster. So the clusters with the best matches on these ratings are the ones to submit to in that embodiment. In general, the various techniques mentioned earlier for enabling users to find appropriate clusters may also be used for artists, including deriving lists of songs from the files made available by the artist for file sharing via Napster, Gnutella, or other means, and/or using presence/absence indeces. It should not be construed that this invention is limited to any particular means for taste-based searching.

In some embodiments, artists are given means to indicate that they wish to pay a particular individual to listen to, rate and/or write a review of their work. In some further embodiments, they can read the review and decide whether it is to be displayed online. In some embodiments, means are provided such as online credit card payment or checking account withdrawal through which the individual reviewer can be paid for doing the rating/review. In order to help the artist decide which user to ask for a rating and/or review, users (who may be Administrators or other users), each have information available online which would help to indicate their suitability. First, if they are members or administrators of relevant clusters, that provides a first level of filtering indicating that their tastes are probably consistent with the interests of the artist. In some embodiments, previous reviews by the user are available in one easily-accessed list. In addition, in some embodiments, if the user has entered his own ratings or explicit or implicit list of most-liked-artists, whether ordered or unordered, the artist can use his own similar information (with regard to similarity of various works to the artist's own work or simply with regard to the artist's own personal likes) to request that the system generate a calculated indicator of appropriateness, similar to that used when users are searching for appropriate clusters. In some embodiments artists can search for appropriate users using these means without consideration of clusters.

Features are provided for helping the artist made informed choices about which users to submit their items to for review. In some embodiments, artists are given input means to rate users on their satisfaction with the ratings and reviews they have paid for. Other artists can see summaries of these ratings, for instance, in one embodiment, averages of the ratings, in order to judge who to pay. (For instance, a reviewer may write a negative review but not make it public, and make it a useful critique of the work, which the artist can use in refining his work in the future; such a review might be negative but still valuable.) In some embodiments, users can set their own fees for reviewing and/or listening.

In addition, in some embodiments, a rating reliability number is calculated for users. This allows artists and other users to know how reliable a particular user's ratings are, helping artists judge whether to submit their items for rating and review by a particular user, and helping users decide which other users' ratings and reviews to read. See Appendix A for more detail. Preferred embodiments, information is not given to the artist that will enable him to choose reviewers who only review highly. For instance, a preferred embodiment only enables artists access to each reviewer's reliability data and cluster membership. Artists will then be motivated to pick reliable reviewers, as compared to reviewers who often disagree with the majority, but they will not have a means to product reviewers who only rate highly. Of course, in such an embodiment, an identifier for a reviewer that would enable the artist to associate him or her with particular displayed reviews would not be made available.

In a preferred embodiment, the system keeps track of the songs a user has been paid to listen to. It notes that user's relative play frequency for the songs in the weeks immediately after being paid, and the play frequencies in the cluster(s) to which the songs belong after some time has passed, for instance, 6 months, and the songs have had a chance to become known. Then, the rank correlation is calculated between the user's play frequency and the cluster's. This correlation is then used as the basis for recommending people to artists to pay to listen to their songs. To have a high correlation, the user must a) actually listen to the songs he is paid to listen to, and b) judge them similarly, relative to each other, to the way the cluster membership as a whole ultimately judges those same songs relative to each other. This embodiment is particularly appropriate in conjunction with the feature that displays songs ranked according to their average frequency of play among those who have heard the song at all (or other similar features). It means that one user or a small number of users can be paid to hear a song, and if they like it, it will immediately be catupulted to the top of the goodness list for a cluster, encouraging still more people to listen to it, enabling good songs to become popular very quickly.

In some embodiments, artists don't have a choice regarding who they pay. Instead, the artist pays a fee, and the system decides the best people to expose the work to and/or extract ratings from. This simplifies things on a number of levels—there can be a less complicated user interface, and the artist needs to do less work. In some embodiments, artists are presented with information to the effect that, for a certain fixed fee per listener, we will pay as many people as he desires (within limits of availability) to listen. Other embodiments enable listeners to set their fees, and the system chooses based upon the fees and calculated reliability associated with each one.

Various forms of payment can be used in various embodiments. For instance, in some embodiments, money is not transferred, but instead an artist promises to make a certain number (or all) of his future recordings available to the listener for low or no cost.

In some embodiments, an "appropriate submission rating" is associated with each artist. Users rate artists with respect to the appropriateness of submitting the given item to the given user for ratings and review, which depends upon how well the item corresponds to the tastes of the user who is being to rate or review. The idea is to create a persistent record of the appropriateness of an artist's submissions in order to discourage him from "spamming" the clusters by submitting too broadly. Users can see a summary of appropriate submission ratings for the artist in question; in some embodiments this is a simple average; in others, it is a Bayesian estimator of the expected rating; in other embodiments, other summarization methods are used. Similarly, artists can see summaries of the appropriate submission ratings generated by various users; this helps them avoid submitting to users who tend to give inappropriately low ratings.

In some embodiments, there is a new songs list. This list simply lists songs that a relatively new, so that people who are interested in listening to new material can do so. This feature may appear in embodiments which do not contain any features for reimbursing those who listen to songs. In some embodiments where appropriate submission ratings are included, the songs may be listed in order of the measured appropriateness of the artist's past submissions. In further embodiments, artists with the worst appropriateness measures may not be allowed to submit at all. Also, in some embodiments, artists who have submitted a certain number of songs in the past must have achieved a certain measured popularity if they are to be able to continue submitting. For instance, the average number of playings per week of the user's past submissions can be used; if it is below a certain point, no further submissions need be allowed. These calculations can be conducted globally or within the cluster membership. In order to keep this list from becoming too crowded, various means are used, such as always including songs for a limited, fixed set of time.

It should not be construed that the role of an artist in this specification could not be played by some other stakeholder in the artist's success, who would use the system for promotion; such an entity could be termed a "promoting user."

Importance of the Administrator

In some embodiments, the administrator plays a role much like that of a radio "DJ." The administrator, sometimes called a "guide" in such embodiments, plays a role in which his own personality and tastes given high visibility. For instance, in some such embodiments, the administrator of a cluster is the only person who is enabled to provide ratings and reviews which are visible to visitors and members of the cluster. In such embodiments, administrators of different clusters compete with each other for the reputation of being the best and most reliable raters and reviewers; reliability is measured as discussed elsewhere. In further embodiments, non-administrators can provide ratings and reviews, but these are given subordinate visibility to those generated by the administrator.

System Environment

In various embodiments, the system runs on the World-Wide-Web, client-server systems based on the TCP/IP or other communications protocols, as a multi-user program accessed by users through terminal emulators, or other technical means. In all embodiments, one or more CPU's run the system, and users are enabled to access it from remote sites through an appropriate means of communication.

Glossary

Item: An article of the subject matter covered by a particular system. In various embodiments, an item can be a song, an album, a recording artist, a book, an author, a video, a director, an actor or actress, a painting, etc.

User: A person accessing the system.

Artist: Creator of items. For instance, the artist Herman Melville created the item "Moby Dick."

Cluster: A cluster is primarily defined by its taste. In various embodiments, clusters have associated facilities such as chat rooms, discussion groups, item purchase facilities, etc.

Cluster Visitor: A user who is using the facilities of a cluster but who has not been registered with the cluster as a member.

Cluster Member: A member has registered by indicating that he wants to join the cluster. In some embodiments, his taste is used in refining the taste of the cluster. In various embodiments members have special rights, such as the right to post to a cluster discussion group or the right to take special discounts when making purchases.

Cluster Administrator: The person or group of people who (in some embodiments) defines the taste of the cluster, moderates chat and discussion rooms, sends notices of events, etc. In some further embodiments, the taste defined by the administrator is further refined by members and/or visitors.

Taste of the cluster: In some embodiments, defined by the cluster administrator. In other embodiments, it is specified only by members by such means as averaging ratings for various items in the subject domain; in still other environments tastes specified by the administrator and members are combined to form the taste of the cluster. Tastes are specified and calculated as described in the text of this disclosure.

APPENDIX A

Some Mathematical Aspects

This appendix discusses aspects of the invention that relate to certain mathematical calculations One problem being addressed is the fact that people can supply ratings that are essentially random (due to not making the effort to provide truly meaningful ratings), or which are consciously destructive or manipulative. For instance, it has been commented that on Amazon.com, every time a new book comes out, the first ratings and reviews are from the author's friends, which are then counteracted with contradictory reviews from his enemies.

The key to solving this problem is to weight each user's ratings according to their reliability. For instance, if the author's friends and enemies are providing ratings simply to satisfy personal needs to help or hurt the author, it would be helpful if those ratings carried a lower weight than those of other users who have a past reputation for responsible, accurate ratings.

A problem solved by this invention is to provide a way to calculate that past reputation.

This reputation can be thought of as the expected "value to the system" of the user's ratings. This is bound up with the degree to which the user's ratings are representative of the real opinions of the population, particularly the population of clusters which are more appreciative of the genre into which the particular artist's work fits.

(To measure the user's overall contribution to the system, we can multiply the expected value of his ratings by the number of his ratings. Users who contribute a large number of valuable [representative] ratings are, in some embodiments, rewarded with a high profile such as presence on a list of people who are especially reliable raters.)

One can measure the representativeness of a user's ratings by calculating the correlation between those ratings and the average ratings of the larger population.

This analysis of measuring the representativeness of a user's ratings has s major limitation, however. It doesn't take into account the fact that a rating has much more value if it is the first rating on an item than if it is the $100^{th}$. The first rating will provide real guidance to those who are wondering whether to download or buy a recording before other ratings have been entered; the $100^{th}$ rating will not change people's actions in a major way. So early ratings add much more actual value to the community. Also, later raters might choose to simply copy earlier raters, so they can mislead any correlation calculations that way.

Therefore, we want to weight earlier ratings more than later ones. The question is, how much more valuable is the $1^{st}$ rating than the second one, and the $2^{nd}$ one more than the $3^{th}$, etc.?

Let S be the set of all items; let N be the number of all items; for s ∈S and 0<i≦N, $s_i$ is the ith item. Let u be the user whose rating representativeness we wish to compute.

Let $g_{i,u}$ be the number of ratings received by $s_i$ previous to u's rating. (i.e., if u gives the first rating for item $s_i$, $g_{i,u}$ is 0.)

Let $t_i$ be the total number or ratings for the ith item.

Let $r_{i,u}$ be u's rating of the ith item, normalized to the unit interval. Let $a_i$ be the average of the ratings for the ith item other than u's, also normalized to the unit interval.

Let $\lambda_1$ and $\lambda_2$ be constants.

Let $q_u$ be the representativeness of u's ratings, calculated as follows:

$$q_u = \frac{\sum_{i=1}^{N} e^{-\lambda_1 g_{i,u}}(1 - e^{-\lambda_2 t_i})|a_i - r_{i,u}|}{\sum_{i=1}^{N} e^{-\lambda_1 g_{i,u}}(1 - e^{-\lambda_2 t_i})}.$$

Then $q_u$ is a number on the unit interval which is close to 1 if the v's ratings have tended to be predictive of those of the community as a whole, and 0 if not.

$\lambda_1$ and $\lambda_2$ are tuned for performance. $\lambda_1$ is a parameter of the cumulative exponential distribution determining the rate of "drop-off" associated with the importance of a rating as more ratings for a given item precede v's rating. $\lambda_2$ is a parameter of the cumulative exponential distribution determining the rate at which the drop-off is associated with the number of total ratings. For instance, if there are no ratings for an item other than v's, the rating has no importance in calculating representativeness and is therefore given weight 0. These parameters can be set manually by intuitive understanding of the effect they have on the calculation. In some embodiments they are set by setting up a training situation in which a number of users rate the items without the means to see other people's ratings; furthermore, these users are selected and given financial or other motivation for putting the effort in to input the most accurate ratings they can generate. These controlled ratings are averaged. Then standard computer optimization techniques such as simulated annealing or genetic algorithms are used to determine values for $\lambda_1$ and $\lambda_2$ that optimize the correlation between these averages and $q_u$. $q_u$ is calculated using the entire population of users in usual viewing mode (such that they could see the ratings of other users). In preferred embodiments, tuning activities are carried out within the memberships of individual clusters. That is, the controlled ratings given by members of a cluster are used to tune the parameters relative to the general ratings given by other members of the same cluster. This is carried out for each cluster. If it is deemed that there aren't enough members of some clusters to effectively tune the parameters separately for each cluster, then in such cases the values for $\lambda_1$ and $\lambda_2$ are averaged across all clusters, and clusters without enough members can use those averaged values. In addition, if a given user has created ratings in multiple clusters, some embodiments simply use the average of his representativeness numbers for all clusters as his single viewable representativeness and some clusters display separate representativeness numbers depending on the cluster in which the numbers are being viewed.

The representativeness of a user is then used for various purposes in various embodiments. In some embodiments, it is presented to artists as a reason to pay a particular user to providing ratings and reviews for new items. In further embodiments, it is used as a weight for the user's ratings when calculating overall average ratings for an item. In some embodiments, listings are provided showing the users' rankings as trustworthy raters, giving "ego gratification"; in must such embodiments these numbers are also available when viewing the user's profile, along with other information presented about the user.

It should not be construed that this invention is dependent upon the particular calculation method for representativeness which is described above.

For example, another embodiment uses the following algorithm for computing the representativeness $q_u$ of user u:

Calculate the average rating for each item, not counting u's rating. For each item, rank the population of ratings in order of their distance from the average rating. In embodiments where discrete ratings are used (that is, some small number of rating levels such as "Excellent" to "Poor" rather than a continuous scale), there will be ties. Simply give each rating a random rank to eliminate ties. For instance, if the average rating is 3, and the ratings in order of their distance from the average are, 3, 3, 4, 2, 5, 5, 1, then after randomization one of the 3's, randomly chosen, will have the top rank, the other will have the next highest rank, the 4 will have the third highest rank, etc.

Call the distance from the average, based on these ranks, the "discrete closeness." Label the ranks such that the closest rating has rank 0, the next closest 1, etc., up to N−1, where N is the total number of ratings of the item. Now pick a random number on the interval (0,1]. Add it to the discrete closeness, and divide the sum by N. Call this quantity the "real closeness" of user u to the average for the ith item and label it $p_{i,u}$. If user u's ratings are randomly distributed with respect to the average rating for each item, then the population of $p_{i,u}$'s has a uniform distribution on the unit interval. It can be shown that, due to this, the quantity $$x_u = -2\sum_{i=1}^{N} \log(1 - p_{i,u})$$

has chi-square distribution with 2N degrees of freedom. A chi-square table can then be used to lookup a p-value, $p_u'$, relative to a given value of $x_u$. The quantity $p_u = 1 - p_u'$ is also a p-value and has a very useful meaning. It approaches 0 when the distance between u's ratings and the averages are consistently close to 0, "consistently" being the key word. Also, as N increases, $p_u$ becomes still closer to 0. It represents the confidence with which we can reject the "null hypothesis" that u's ratings do not have an unusual tendency to agree with the average of the community. So $p_u$ is an excellent indicator of the confidence we should have that user u consistently agrees with the ultimate judgement of the community (in most embodiments, this is the community within a taste cluster).

Preferred embodiments using the chi-square approach also include weights relative to how early u was in rating each item and to take into account the number of ratings for each item.

Let $w_{i,u} = e^{-\lambda_1 g_{i,u}}(1 - e^{-\lambda_2 t_i})$, where $g_{i,u}$ and $t_i$ are defined as before. Let $$y_u = \prod_{i=1}^{N} p_{i,u}^{w_{i,u}}$$

Then $$p_u' = \text{Prob}\{y_u \leq b\} = \sum_{i=1}^{N} \frac{b^{\frac{1}{w_{i,u}}}}{d_i},$$

where $$d_i = \frac{(w_{i,u} - w_1)(w_{i,u} - w_2)\cdots(w_{i,u} - w_{i-1})(w_{i,u} - w_{i+1})\cdots(w_{i,u} - w_N)}{w_{i,u}^{N-1}}$$

We use $p_u = 1 - p_u'$ as the measure of representativeness, with numbers closer to 0 being better, as before.

Finally further embodiments provide weights for one or both of the terms in the expression for $w_{i,u}$. Proper weights can be found using the same procedures as are used for finding $\lambda_1$ and $\lambda_2$; using genetic algorithms and other optimization techniques, in some embodiments all these weights are found at the same time.

In general, in various preferred embodiments of the invention, various algorithms that allow a representativeness number to be calculated which includes the predictive nature of the user's ratings are used, so the invention as a whole has no dependency on any particular method.

When displaying the quantities calculated as the representativeness numbers, preferred embodiments calculate rankings of the various users with respect to those numbers, or percentile rankings, or some other simplifying number, since the representativeness numbers themselves are not intuitively comprehensible to most users.

Another useful feature emerges if we take $g_{i,u}$ to be a measure of elapsed time in days between the public release of an item and the time the user rated it (which can be 0 if the review preceded or coincided with the public release), and $\lambda_2=\infty$. Then the approaches mentioned above for calculating representativeness can be extended to such situations as measuring the value of a user in predicting the overall long-term sales of particular items (or even to predicting stock market prices and movements and other similar applications).

For instance, in some embodiments, a correspondence is made between ratings and ultimate sales volumes. In one such embodiment, the following algorithm is executed. For each rating level, all items with that average rating (when rounded) are located which have been on sale for a year or longer. Then, within each cluster, average sales volumes for each rating level's items are calculated. Then this correspondence is used to assign "sales ratings" to each item based on the total sales of that particular item; the actual sales are matched to the closest of the rating-associated levels of average sales, and the corresponding rating is used as the sales rating. (If there hasn't yet been enough activity in a particular cluster to conduct this exercise meaningfully, system-wide averages are used.)

In this embodiment $p_{i,u}$ is computed using rankings of distances from the sales rating rather than from the average rating. Then $\lambda_2$ is set to $\infty$ (in other words, the $(1-e^{-\lambda_2 t_i})$ term is set to 1). Then we calculate the representativeness, $p_u$, as before.

As with the case of calculating representativeness with respect to general ratings, it should not be construed that this invention is dependent upon the specific calculations given here for calculating a user's ratings' representativeness with respect to sales; other calculations which accept equivalent information, including the user's ratings, the sales volumes, and time data for ratings and sales (or, equivalently, elapsed time data), outputting a representativeness which involves a predictive component, will also serve the purpose of providing equivalent means for use by the invention overall.

For instance, in some embodiments, a rank-based technique is used for calculating representativeness. In one such embodiment, time data is used to determine the items that the user rated soon after their release (or at or before their release) and that have now been on the market long enough to meaningfully measure sales volumes. These items are used to perform Spearman rank correlation between the user's ratings and general ratings or sales volume; other items are ignored. Other embodiments perform rank correlation based on this restricted sample and separately perform rank correlation upon all items rated by the user, and perform a weighted average on the results.

Additionally, this application incorporates by reference the entire contents of abandoned U.S. patent application Ser. No. 10/837,354, filed on Apr. 30, 2003 and published as U.S. Published Patent Application 2004/0225577 A1 on Nov. 11, 2004. The specification of that application teaches the currently most-preferred approach to measuring representativeness.

Note 1: In some embodiments, it is possible for a user to change his review and rating of an item over time, since he may come to feel differently about it with more experience. But for purposes of calculating, his earlier ratings are stored. In preferred such iterations, the last rating of an item entered on the first day that he rated that item is used.

Note 2: In cases where the cluster has too few ratings or sales to do meaningful calculations, "virtual" clusters can be created by combining clusters with similar taste signatures into one larger clusters for purpose of computing representativeness. In preferred such embodiments, clusters are successively added to the original cluster, and the representativeness recalculated as long as the representativeness number continues to rise with each iteration. When it declines, this process ends. The maximum representativeness number obtained in this way is the one assigned to the user.

Note 3: In various embodiments the discussed calculations are conducted at either the "artist level" or "item level". That is, in some embodiments the artists are rated and calculations done from those ratings and in others item ratings are used.

APPENDIX B

Introduction

This brief document presents a methodology for clustering songs by calculating "information transfer" as that value is calculated within the framework of Shannon entropy.

First, we will present a simple clustering algorithm will be presented, and second, we will present Python source code for calculating information transfer between clusters and users. Together, these techniques comprise a complete solution for clustering songs.

Clustering Algorithm

For simplicity, and to maximize the probability of showing that our basic approach can find useful clusters, we will use one of the most simple clustering algorithms possible, which does not contain possible optimizations to improve computational speed.

Here are the steps:
For each song not yet assigned clusters (note that the first time the system is started, this would be all songs):
    Randomly assign a cluster.
Repeat:
    For each song (including new songs not yet added to clusters):
        For each cluster other than the original one the song is in:
            Compute the change in total system information transfer that would occur if the song were moved to the other cluster.
            If at least one such potential move would result in an increase of information transfer:
                Execute the move that results in the greatest increase.
    If no movements occurred in the "For each song" loop:
    Delay until there is a new song to process.
    The above can continue until we want to bring down the system.

It would be great if an administrator console could see, via the Web, a history of the number of distinct songs moved per hour, so that we can monitor how the system is evolving toward stability. If no songs were moved in recent hours, we know that optimization is complete (of course that will only happen if we stop adding songs).

Calculating Information Transfer

A Python example will be used to describe the algorithm.

At the top of the Python listing is a matrix. Each row represents a cluster and each column represents a user. The numbers represent the number of songs in ith cluster that are associated with the jth user. For example the $10^{th}$ user is associated with 3 songs in the $4^{th}$ cluster. With Radio Userland data, this would mean that the user has played the song.

When a song is moved from one cluster to another, a number of counts in the matrix may be affected, both in the originating cluster and the target cluster, because that song will be associated with a number of users. Subsequently, the clustering algorithm, which must "try" various possible movements to find the best one, will be very computationally expensive. Various tricks can be used to minimize the number of computations to be done; the Python code below uses virtually no such tricks. It would be appropriate for early Java versions to be equally free of optimizations; for one thing, the fewer optimizations, the less chance for bugs to be introduced into the code. Then we can refine from there, always checking to make sure our optimizations don't change the output numbers. We can check this by loading the database with test data, setting the random number generator to a constant seed, and running the algorithm after each enhancement. The resulting clusterings should always be identical after the same number of iterations. NOTE: There should therefore be some easy way to load the same test data into the system repeatedly.

Obviously, a line-by-line conversion to Java probably doesn't make sense. For one thing, an index-based data structure will probably not be appropriate, because the ID's of the users, after filtering, will not be contiguous. And some users may be dropped from the processing over time for one reason or another. So some kind of map structure would seem to be more appropriate. The row-and-column naming convention would therefore probably also not make sense in the Java version.

Note 1: In the initial release, let's count all user-song-associations as being a 1 no matter how many times the user played the song. So, to get a count of 3 in a cell in the matrix, a user must have played 3 distinct songs. Future versions may count each play as a separate association.

Note 2: it is traditional to use log base 2 when doing Shannon entropy calculations, but if there is no log base 2 function in the Java libraries, we can use natural logarithms.

PYTHON CODE BEGINS HERE

```
lstLst=[
    [1, 0, 0, 0, 0, 0, 0, 0, 0, 0, 0, 0, 0, 0, 0, 0, 0, 0, 0, 0, ]]
lstLst.append(
    [0, 1, 1, 1, 0, 0, 0, 0, 0, 0, 0, 0, 0, 0, 0, 0, 0, 0, 0, 0,])
lstLst.append(
    [0, 0, 0, 0, 1, 1, 1, 0, 0, 0, 0, 0, 0, 0, 0, 0, 0, 0, 0, 0,])
lstLst.append(
    [0, 0, 0, 0, 0, 0, 0, 1, 9, 3, 1, 0, 0, 0, 0, 0, 0, 0, 0, 0,])
lstLst.append(
    [0, 0, 0, 0, 0, 0, 0, 0, 9, 1, 1, 1, 1, 1, 1, 0, 0, 0, 0, 0,])
lstLst.append(
    [0, 0, 0, 0, 0, 0, 0, 0, 0, 1, 0, 0, 0, 0, 1, 1, 1, 0, 0, 0,])
lstLst.append(
    [0, 0, 0, 0, 0, 0, 0, 0, 0, 0, 0, 0, 0, 0, 0, 0, 0, 0, 1, 1,])
import math
def minusPLogP(float_):
    """
    Takes a probability associated with a particular value for
        a random variable, and outputs that value's contribu-
        tion to the Shannon entropy.
    """
    if float_==0.0:
        return 0
    else:
        return−float_*math.log(float_)
def countCol( ):
    """
    The number of users.
    """
    return len(lstLst[0])
def countRow( ):
    """
    Return the number of clusters.
    """
    return len(lstLst)
def sumRow(int_row):
    """
    Sums user-song-association instances for a single cluster.
    """
    int_sum=0
    for int_col in range(countCol( ):
        int_sum=int_sum+lstLst[int_row] [int_col]
    return int_sum
def sumCol(int_col):
    """
    Sums user-song-association instances for a single user.
    """
    int_sum=0
    for int_row in range(countRow( ):
        int_sum=int_sum+lstLst[int_row] [int_col]
    return int_sum
def sumTotal( )
    """
    Sums user-song-association instances across the universe.
    """
    int_sum=0
    for int_row in range(countRow( )):
        for int_col in range(countCol( )):
            int_sum=int_sum+lstLst[int_row] [int_col]
    return int_sum
def userUncertainty( ):
    """
    Loop through the users, calculating the probability, p,
        that a randomly
    chosen user-song-association instance would be associ-
        ated with the user being looped through.
    Then sum p log p for all users.
    That is the Shannon uncertainty for the user population.
    """
    float_sum=0.0
    int_total=sumTotal( )
    for int_col in range(countCol( )):
        float_p=float(sumCol(int_col))/int_total
        float_sum=float_sum+minusPLogP(float_p)
    return float_sum
def clusterUncertainty( ):
    """
    Loop through the clusters, calculating the probability, p,
        that a randomly
    chosen user-song-association instance would be associ-
        ated with the cluster being looped through.
    Then sum p log p for all clusters.
    That is the Shannon uncertainty for the cluster popula-
        tion.
    """
    float_sum=0.0
    int_total=sumTotal( )
    for int_row in range(countRow( )):
        float_p=float(sumRow(int_row))/int_total
        float_sum=float_sum+minusPLogP(float_p)
    return float_sum
def jointUncertainty( ):
    """
    Loop through all unique combinations of user-cluster,
        calculating the probability, p, that a randomly chosen
```

```
            user-song-association instance would be associated
            with the user-cluster combination being looped
            through.
        Then sum p log p for all user-cluster combinations.
        That is the joint Shannon uncertainty for the cluster
            population.
    """
    float_sum=0.0
    int_total=sumTotal( )
    for int_row in range(countRow( )):
        for int_col in range(countCol( )):
            float_p=float(lstLst[int_row] [int_col])/int_total
            float_sum=float_sum+minusPLogP(float_p)
    return float_sum
def calculateInformationTransfer( ):
    """"""
        Calculate the information transfer.
    """
    return userUncertainty( )+clusterUncertainty( )−join-
        tUncertainty( )
print 'User uncertainty:', userUncertainty( )
print 'Cluster uncertainty:', clusterUncertainty( )
print 'Joint uncertainty:', jointUncertainty( )
        print 'Information transfer:', calculateInformation-
            Transfer( )
```

An Optimization Strategy

This strategy is used by preferred embodiments of the information transfer algorithm.

Add new user-song associations in batches, allowing a significant period of time between each batch.

Since the total that is in the denominator of all the p calculations will not change in between batches, that makes it possible, at the end of a batch load, to create a one-dimensional array to represent the p log p values, where the index is the numerator in the p calculation. Thus, each relevant p log p calculation only needs to be performed once, and is then reused.

Instead of actually re-allocating memory for the array at the end of each batch load, the array can be zeroed out. A 0 in an element indicates that p log p has not yet been calculated. So, when a value is needed for p log p, the appropriate element is checked, and if it is 0, it is calculated. If it is non-zero, then the value that is there is used.

BIBLIOGRAPHY

Klir, George and Folger, Tina. *Fuzzy Sets, Uncertainty, and Information*. Englewood Cliffs, N.J.: Prentice Hall, 1988.

Manly, Bryan F. J. *Multivariate Statistical Methods, A Primer, Second Edition*. London, England: Chapman & Hall, 1994.

Hedges, Larry V. and Olkin, Ingram. *Statistical Methods for Meta-Analysis*. San Diego, Calif.: Academic Press, 1985.

Snijders, Tom A. B., Maarten Dormaar, Wijbrandt H. van Schuur, Chantal Dijkman-Caes, and Ger Driessen [1990]. "Distribution of Some Similarity Coefficients for Dyadic Banary Data in the Case of Associated Attributes." *Journal of Classification*, 7, pp. 5-31.

http://www.google.com
http://www.interbase.com/
http://napster.com

APPENDIX D

This appendix describes The Tastemaker Game, which is based on some of the core ideas taught above in this specification, and additionally includes certain other aspects, include game-like ones.

The Tastemaker Game (TMG) is intended to achieve the following objectives:

Spread virally to gain a large user base.

Obtain the data needed to accurately recommend emerging artists.

Provide the basis for substantial income for the sponsoring company.

Overall Aims

The TMG approach involves several key elements.

Integrity-based paid stakeholder influence. TMG enables labels and indie artists to pay money to get exposure for an artist. This echoes the old, payola-based radio days. The concept of payola is in considerable disrepute now because it puts the interests of labels before the interests of music lovers. But the key to the tastemaker concept is that it only enables worthy artists to be helped; the same artists that music lovers want to hear. This is because people who have chosen to play the role of tastemakers hear the music before consumers do; the money goes to get the music in front of tastemakers, not consumers. If tastemakers don't like a track, consumers will never hear it.

In the end this is a win-win even from the labels' point of view, because trying to push unworthy artists is simply less efficient than trying to push worthy ones. TMG will be a very effective way to separate the wheat from the chaff. The more quickly labels can find out who is the wheat and who is the chaff, the more efficiently their money can be spent. The artists who reach the highest levels of popularity in a system embodying the present invention will be great candidates to be pushed using traditional, mass marketing-based techniques.

This ability to elicit labels and indie artists to pay, while keeping quality-based integrity from the point of view of music consumers, is the "secret sauce" behind the whole tastemaker concept. Reward the tastemakers. Tastemakers are individuals who make the effort to differentiate good music from poor music, and who supply the information needed to accurately target music to consumers who will love it. Because any person who wants to can upload a track and make it available to the world (there are now ten million artist pages on MySpace), there is a tremendous amount of material to sift through.

No service to date has been able to do it, and that is why even in 2010, the Internet has still not enabled indie artists to sell their music. No one is doing the work of finding the worthy-but-unknown material and bringing it to the attention of those who will most enjoy it. The amount of work involved is huge, and growing more huge every day as more tracks are uploaded. Most of the listening won't be pleasant—probably 98% of it. So, the tastemakers need to be rewarded for their efforts.

TMG offers the necessary rewards. They involve money in the form of prizes, but also fun (since TMG is a game) and the appreciation of peers. Together, these rewards should provide the necessary motivation, and TMG will be the word's first service to do so.

We will refer to this model of rewarding the tastemakers as "the tastemaker model."

Create a service that can grow from a handful of users. The prizes, fun nature of the game, and the appreciation of peers have already been mentioned. In addition, TMG has the potential to be a "cause," something worth working to feel one is contributing to the world. Because users will benefit from knowing they are helping, the service will add value to their lives, increasing its ability to spread virally by word-of-mouth (in both online and offline communications).

The Game

Preferred embodiments of TMG have the basic appearance of a music player which plays tracks, one after the other. The user interface gives the user the ability to rate and (optionally) add tags or other information. For instance, a player who is waiting in line for 5 minutes somewhere, and has his iPhone, could play the game for a while by listening to tracks and responding appropriately to each one.

In preferred embodiments, prizes are giving out every month. A user can earn points toward a prize in the following ways:

Rate the current track in a way that is consistent with other people who have similar tastes.

Add metadata to a track. This includes tags and genre information.

Ratings take the form of a five-point scale. The user can also choose a pseudo-rating that means:

The track is already available in the system.

The track is not free.

To add to the fun, real-time "bells and whistles" relating to score updates, physical locations of other players listening to the same song, etc. can be presented, depending on the platform. They don't interfere with functional simplicity because they don't require any user interaction.

Scoring and Prizes

The basic idea is that people get points just by supplying information about music tracks, which, in preferred embodiments, are free (i.e., can be streamed and/or downloaded for free, depending on the embodiment). The info may be as basic as their ratings of the tracks on a five-point scale. If they like, they can add tags and other information.

The basic thing players need to know is that when they add information to a track's profile, even if it's only by rating the track, they help a service embodying the invention target the song more appropriately to people who may enjoy it—and that means those "downstream" listeners may play the track all the way through. If they do, the player earns points. On the other hand, if downstream listeners don't listen to the whole the track, the player loses points.

This approach motivates players to be aggressive about finding good new tracks before others do, because players who add information to good tracks earliest receive the greatest number of downstream plays. It also motivates users to give track information that is useful for targeting: the more useful the information is, the more people who hear the track will play it all the way through. And tracks that are consistently played through will be heard by more people. Prizes are given out on a regular basis, probably weekly or monthly, based on points. These prizes will necessarily be modest at first (for instance, an iPod), which is why it is essential that the game be fun.

And it will be fun, because it will be a competitive, skill-based game with real-time feedback. The prize adds to the enjoyable experience, but cannot be expected to provide enough motivation on its own. Once a service reaches critical mass, stakeholders in the success of particular artists will be motivated to exchange points earned via those artists' tracks for monetary prizes, which may grow to be quite large.

User Interface

The UI will be centered around a simple and attractive radio player, not unlike Pandora's. A radio experience is the heart of TMG because it needs to be an enjoyable, enticing way for people to hear recommended music.

Pandora has shown the world how to create a radio that can reach many millions of users. Using a similar simple player model, Jango started in November 2007 and by January 2007 had 1 million users.

But TMG has features beyond what a simple radio does because, after all, it's a game, and it involves user interaction for those who want to participate. To resolve this apparent contradiction, there will be two UI modes: "Basic" and "Advanced" (not necessarily identified by those terms in the final product).

The Basic mode is a simple radio, which lets you type in an artist and get related music out. But it has a little bit extra: it displays some information, updated in real-time, in relation to the track, artist, and/or tastemakers who are driving the track.

This should be enough to give a new user a sense that there is an underlying fun real-time game, which they have the option to investigate if they wish.

Tastemaker Mode is made available based on a single platform-specific gesture—a click in a Web browser or a tap on a mobile device. It reveals more of the game, on the same screen as the radio player. It also provides links to other screens where appropriate to reduce clutter on the main game screen. Tastemaker Mode can be seen as a game control panel. Tastemaker Mode presents the user with such game elements as:

The ability to view and edit tags for the current track such as "instrumental" and "singer-songwriter" as well as traditional genre information. This data is used to route the track to players the players who are most likely to enjoy them.

The ability to enter and modify a list of similar/related artists.

The ability to rate the current track.

The ability and edit the user's personal profile information, which contains tag, genre, and favorite artist information. This information is used to help target tracks to each user.

A slider which lets each tastemaker choose a proportion of vetted to unvetted tracks. Unvetted tracks are those that haven't had a lot of profile improvements done already; they may be tracks that were added to the system a few minutes previously. Those are the tracks where there is the most opportunity to earn points. The vetted tracks will be the most reliably enjoyable to listen to. Different people may want to choose different mixes of the two.

A list of tracks that were recently played and that are going to be played. The casual, passive listener doesn't need that information, but an active tastemaker will find it useful to be able to pick and choose. Clicking one of these tracks makes it the current track. (In the absence of clicking, the current track automatically changes to the next listed track when the current track stops playing.)

The user interface should also present a list of written reviews of each track, supplied by users. Such a list of reviews is an important part of the experience of services like Amazon.com and the iTunes music store. Since the free music preferred embodiments focus on will mostly be relatively unknown artists, there won't be many (or, in many cases, any) such reviews on such mainstream sites. TMG can and should fill that role. In preferred embodiments the review list to be separate from the Tastemaker Mode functionality, but still hidden while the user is in Basic mode. There would be a separate gesture to reveal the list.

Enable Artists to Get Safe Feedback

Artists need feedback. TMG will enable artists to get feedback in a relatively safe and easy setting through track profile editing, including the ratings component. Some embodiments additionally include user-written reviews.

To protect an artist's reputation, preferred embodiments make user-written reviews only visible in certain circumstances; for instance:

The artist can always see the reviews.

Songs whose value has been proven through consistently high ratings.

In such embodiments, tastemaker-generated ratings of the songs are used for targeting and so have real value; they just aren't always visible.

And of course, the tastemaker system automatically keeps poor material from getting into the Basic Mode radio player, so artists are presented to consumers in their best light.

Scoring

Scoring is based on downstream events as discussed elsewhere in this specification. Here we fill in some details.

QUESTION: How does the invention ensure that points are only awarded to people whose track profile enhancements actually improve the accuracy and/or usefulness of the track data? First, some embodiments make sure that a track profile edit shows a statistically significant improvement in play-through rate compared to its predecessor taste profile.

Beyond that:

If an individual tends to make changes that do not lead to a higher proportion of play-throughs in when tracks are played downstream, servers can pick that up using statistical analysis, and various measures can be taken such as disallowing that user from making changes in the future, deleting his points, and making sure he does not get a prize. A warning can be sent to the user as a first step. Facebook does something analogous to this; when its software thinks someone may be a spammer, it emails them and temporarily bans them from certain activities.

Since only a small number of prizes will be given out each month, human judges can validate each user's input to make sure that a prize goes to the highest point-earners whose changes are consistently enhancements, rather than simply to the highest point-earners.

QUESTION: Most tracks are likely to be bad. How are tastemakers motivated to handle those properly?

Various embodiments don't only award points for downstream play-throughs. Some also subtract points for downstream partial plays. So, tastemakers will maximize their points by entering low ratings for tracks they don't think are good—or by ignoring those tracks entirely.

Either approach is fine, because it is not as important to accurately award low ratings. Whether a track is poor or fair, it should probably not be played at all once ratings have converged. It is better to focus tastemaker energy on accurately awarding ratings to the very best tracks.

QUESTION: Is one point earned for each downstream play?

No, for the following reasons.

One point per play-through gives tracks that turn out to be huge hits (in the TMG environment) too much influence over who gets the prize. For instance we don't want someone who makes a few small track profile enhancements that happen to correspond to massive hits to necessarily get a prize; we want people to be motivated to enhance many track profiles.

We want the prizes to correspond to the people who add the greatest amount of useful information to the system. In many contexts, and for reasons that are fairly deep mathematically, it has been found that information is best measured with the logarithm of the raw data. In fact, "information theory" is based on computing the logarithm. We already do this in many parts of the recommendation engine, and that is essential for its high performance.

The logarithmic approach discourages cheating by trying to manipulate a the playcounts of a few tracks because it gives more weight to playcounts derived from larger numbers of tracks. Preferred embodiments make this very simple for the user to understand by presenting a table that does the approximate translation of play-throughs (and partial plays) to points added (and subtracted). The user doesn't need to understand any mathematical concepts. The logarithm is computed behind the scene.

The use of logarithms in the point processing may turn out to be one of the most powerful aspects of the invention, helping to maximize the amount of useful information obtained from tastemakers.

Prizes

It is well-established that offering prizes is very efficient for motivating useful work, at least in cases when the work is also interesting or rewarding in other ways. The most notable recent example of that is probably the Netflix Prize, which set a goal which was recently met (10% improvement in ratings projection accuracy). On an individual scale, Mechanical Turk tasks frequently use prizes in addition to per-piece payment.

Rewarding only the top tastemakers with prizes rather than paying with prizes also has an interesting security benefit because, to the extent that manual review may be needed on the part of the staff of an organization running the service, it's far easier to verify a few people's work than to review everyone's work.

Editing Track Profiles

QUESTION: When a tastemaker makes a new version of a track profile, what happens to the old version?

Several versions of a track profile may be active (having responsibility for playing the track in the radio) simultaneously.

Preferred embodiments make a track profile inactive after either:

To a statistically significant degree, its performance is worse than the performance of its predecessor track profile version.

Or:

It has been operating long enough to have a reasonable shot at showing a measurable increase in performance, and has not shown it, and a subsequent track profile has shown a statistically significant degree of superior performance.

The reason we give each track profile a reasonable shot at showing an increase in performance is that we don't award points until after that increase is shown.

QUESTION: What happens if an incompetent or malevolent tastemaker makes a destructive change to a taste profile?

On Wikipedia, bad changes are normally corrected by the community. We can expect that to happen in TMG.

In addition, as noted above, changes that perform badly enough at targeting that the software can pick up the poor performance are automatically reverted.

QUESTION: What if two people try to edit the same taste profile at the same time?

There are two basic approaches possible. Which one to use depends largely on whether user-written reviews are included in Tastemaker Mode. This is because of two factors:

Two variants of user-written text will often be different enough in ways that make it impossible to automatically merge them together into one coherent text item.

It takes enough effort to write text that we don't want text written by a user to be automatically discarded.

Simple embodiments do not include user-written reviews, so the text-merging problem does not arise.

QUESTION: How do we handle editing conflicts in the absence of user-written reviews If two people are editing the same taste profile at the same time, and user-written reviews are not included, then there are two kinds of data that have to be managed:

Lists such as lists of tags. These can be merged by taking the union of the elements of the two lists.

Ratings. This is not a problem because the invention saves each user's rating separately. When we display ratings we display combination of past ratings (such as an average) so we are merging the data anyway; nothing special has to happen to handle this case.

Other simple user-entered data that is not explicitly described herein can be handled in one of the above ways or (if it is data that does not require a lot of effort to create) simply accepting the most recently-entered variant.

QUESTION: How do we handle editing conflicts in the presence of user-written reviews The preferred embodiment sets a timed lock on a track profile when a tastemaker starts editing it. One person can edit a profile at a time. If someone else tries to edit it at the same time, he is told to try again later. If more than a couple of minutes passes without input from the user who has the profile locked, the invention puts up an alert asking him to confirm that he's still working on it. If there is no response to the alert, we unlock the page (and discard any partial changes the user may have made).

Such a solution leaves open the possibility of (for instance) a malevolent user trying to keep track profile improvements from happening by writing a script to simulate a very long series of edit operations, leaving little time for a legitimate user to lock the profile and make an edit.

One of ordinary skill in the art can design the software to sense such unusual series of operations, and prohibit the user from further access to the taste profile for a certain period of time.

User Interface

This section will discuss the user interface. The ideas presented here will be a basis for further discussion.

Basic Mode UI

Preferred embodiments contain the following items, but various embodiments may contain other subsets or supersets.

Input area for the user to enter one or more artists as the basis for recommendations.

Music player with the usual basic controls for play, pause, repeat, and skip.

Points earned from this track—the total points earned, so far, by all the tastemakers who have edited the track profile. This will give casual users an indication that there is a potentially interesting game here, without being enough data to confuse and overwhelm them. It should be updated in real time, so that the viewer can see that activity is happening while she is listening.

A link labeled "Play the TasteMaker Game, and win prizes." Clicking this link causes the user to enter Tastemaker Mode.

(If appearing in Facebook:) A link to the artist's Facebook Page or primary Group. (Or, if on another platform, an appropriate link for that platform if one exists.)

An indicator of whether the track is sponsored, and any associated links the sponsor wanted to show.

Tastemaker Mode UI

Depending on the platform and embodiment, the tastemaker mode UI may take up one or more screens. For instance, much more can appear on a web page than on an iPhone screen.

Some of the input areas, such as the one to enter tags, will benefit from providing some means to encourage users to use tags already in the system, rather than making up new ones. Otherwise it will be much harder to use them for targeting. There should also be a means for users to create new tags when necessary. Various embodiments copy techniques from web sites or other services that use tags, and use them for other input areas as well. For instance, entered genres should match pre-existing genres. (And in the case of genres, there may be no need to provide the user with new genre creation abilities because services can use industry-standard genres and subgenres.)

Some embodiments enable the tastemaker to enter personal information such as tags corresponding to his musical interests. However, the tastemaker will be entering artists into the top of the player just as Basic users will, and this can be used for targeting. Using other information for targeting would require separate recommendation code. Moreover, by using the same information as is used for Basic users to power the recommendations, the tastemaker is more likely to receive the same tracks Basic users will for the same input, which will, in some ways, make his response to those recs more valuable.

Note that various embodiments can involve various subsets or supersets of the following elements.

At the top of the screen, all the attributes of the Basic Mode are included, so that it appears that when Tastemaker Mode is entered, the screen has simply expanded to reveal the tastemaker features.

Links are provided to enable new users to register or logon; if the user is already logged on, that is indicated by showing her name.

Tastemaker-modifiable track-related data:
Track rating input on a five-point scale.
Related/Similar artist input area.
A tag input area. Tags are descriptive terms such as "singer-songwriter" or "acoustic."
A genre input area.
An area to enter a written review of the track.

Non-modifiable track-related data:
Artist name (linked to the artist's web site or an internal page for the artist).
Track name.
Album name (if applicable).
The number of data modifications to date.
The number of play-throughs to date.
The number of partial plays to date.
The number of other tastemakers who edited the track data before the current tastemaker.
The total number of tastemakers who have edited the track data.
The number of the current tastemaker's downstream play-throughs for this track to date.
The number of the current tastemaker's downstream partial plays for this track to date.
The current total of points awarded for this tastemaker for this track to date.

Tastemaker-related data:
Total number of downstream play-throughs.
Total number of downstream partial plays.
Total number of points for all time.
Total number of points for the current game period (such as a month, if prizes are awarded on a monthly basis).
Point-based rank among tastemakers.
Earned title (for example, if a tastemaker is among the top 100 tastemakers, she could receive a title such as "Wizard").

General Data:
  Top 10 tastemakers for the current game period with their points.
  A list of recently-edited track profiles, showing the number of edits to date for each one.
  A slider labeled, on the left, "Maximize Listening Experience" and on the right "Maximize Point Earning Potential," or using other phraseology with the same implications. Most tastemakers will probably put the slider all the way to the right while they are focused on earning points, but they may want a hybrid, background listening experience that is enjoyable while still gives them the potential to earn points when they see a particularly good opportunity to.
  A link labeled "Hide Tastemaker Features." Clicking it brings the user back to Basic Mode.

Adding Tracks

In some simple embodiments, TMG can rely completely on tracks in an external, pre-existing free music collection.

But in many embodiments artists, or their official representatives, such as labels, will be able add their tracks to the system. We will refer to such agents as "stakeholders." When they add tracks, stakeholders will be encouraged to fill in the track profile, so that the user community has less work to do, and so that fairly accurate track targeting can occur as soon as possible.

One major question is: should stakeholders need to pay money to get a track into the system?

Pro:
  Even small fee, such as five dollars, would play a very useful role in weeding out total junk.
  The sponsoring company will need to know that it has the legal right to make the track available for free (in embodiments using free tracks). If any manual work needs to be done to verify that, there will need to be some compensation to cover the human resource expense.
  A fee would make it much easier for the company to supply compellingly large prizes—if stakeholders were willing to pay it.

Con:
  It is possible that even a small fee would cut down on the number of legitimate tracks made available to the service and make it unworkable, at least during its sensitive, initial phase. Once a system has critical mass, stakeholders will be willing to pay a fee, and even pay larger amounts of money to get more attention from stakeholders.

One solution, if a service doesn't need to do manual work to verify its rights to a track, used by certain embodiments, is to allow tracks to be added to the system free of charge, but to allow stakeholders to optionally "sponsor" a track by paying a small fixed fee, such as ten dollars. While points would accrue to tastemakers for editing any track, and prizes would be awarded based on points, points earned in association with sponsored tracks would lead to larger prizes. This would mean that there is an advantage to sponsoring a track, while unsponsored tracks still benefit both stakeholders and the service's radio listeners (because if they are good, they will be able to hear them; the higher the number of quality tracks that are available, the more enjoyable the service will be for these users). Techniques which would reduce the need to rely on human resources to authenticated newly-added tracks include:
  Enabling tastemakers to flag tracks as questionable. Services can then manually check flagged tracks; this would be much less time-intensive than checking all tracks.
  The use of cell phone SMS authentication. Some web-based services which have a need for security require the user to supply a cell phone number during registration. For example, a passcode is text-messaged to the cell phone, and the user has to type it into the web site to complete registration. The advantage of this approach is that the cellular provider has already authenticated the user and has all his personal information; if one thought that a person was uploading tracks he didn't have a right to, one could take him to court by subpoenaing those records.

Avoiding Duplicate Tracks

Since preferred embodiments only allow stakeholders to upload tracks, this problem will be minimized.

Beyond that, many embodiments require track identification (artist name, track name, album name) to be entered in a canonical form; matches should be easy to spot in software. They shouldn't occur often; the sponsoring company's staff can manually deal with them when they do.

Security

During the very early stages of TMG's existence, there won't be a need to worry much about malicious users since the game will not have much impact on the music industry and will not have large prizes.

As a service grows, it will benefit from the fact that TMG's basic structure is manipulation-resistant. Using logarithms in the generation of adds to security because it means that tastemakers have to successfully modify a substantial number of taste profiles in order to earn sufficient points to win. They can't just modify a few and then generate fake play-throughs for each of those.

The fact that it will be hard to earn a lot of points by manipulating the system also means that it will hard to boost particular tracks by manipulating the system, because the power of each user to influence recommendations will be proportional to the number of points he has earned. (This will be built into TMG's recommendation engine.)

In addition, if and when there is a need as TMG becomes very prominent, there are various data mining techniques that can be used to try to sense malicious activities, akin to what is done on many other sites. One of ordinary skill in the art of spotting malicious activities in an online service will readily see how to do this.

Monetization

There are two forms of monetization available to TMG: front-end and back-end. Front-end monetization involves upfront payments from the stakeholders in the success of particular artists to help them reach their potential audiences. Back-end monetization involves referral fees and/or revenues from retail sales.

Front-End Monetization

Front-end monetization is based on track profile sponsorships. Labels and indie artists (stakeholders) pay a fee to sponsor a track. Sponsored tracks get more attention from tastemakers because tastemakers who edit sponsored track profiles win larger prizes for downstream play-throughs.

As the user base grows, these fees will add up to be a meaningful source of revenue. There are many independent artists trying to make it (MySpace has ten million artist pages). If a sizable number of them paid the fixed fee for one or more tracks, that would be substantial revenue; of course, the sponsoring company will keep a portion of the fees, and the rest will go to tastemaker prizes.

However, a reasonable long-term plan for a TMG implementation is a bit different from that. That long-term plan is to support competition between stakeholders, using sponsorship fees as the means of competition. To do this, in many embodiments, the sponsoring organization will eventually remove the constraint that the sponsorship fee is fixed. Instead, there will be a minimum fee, with no maximum.

In a very real way, sponsors will be bidding against each other for the attention of tastemakers.

Back-End Monetization

TMG may be able to create a space in the music industry which involves enthusiastic, passionate listeners who are spending substantial amounts of their listening time listening to non-major-label music. And the aim is that those listeners will not only be listening to free music: they'll be willing to buy music from artists they come to love.

A TMG-based service be able to get into a position where we control substantial numbers of those sales. It can refer our users to Amazon or iTunes. But digital sales, it make make sense for to sell tracks and albums directly from the service's own site in order to retain all the profit, rather than just a referral fee.

Platforms

In this section we discuss various platforms for implementation of TMG.

Facebook

Posting to Facebook Streams

The most important way Facebook supports virality is in the fact that it allows applications to post events to a user's stream, where they will be seen by friends of the user. Note that friends don't even need to go to the user's Profile page to see the events; they are automatically inserted into the friends' Home page streams. These events can be simple text, or links, or MP3's, or flash widgets. Preferred embodiments advantage of this. But they do so in a way that users will enjoy—the sponsoring company can't use it to transparently push it's own agenda; every event posted has to serve to communicate something from the user to her Facebook friends that she wants to communicate.

Here are examples of events that can be posted to a tastemaker Facebook user's stream (always with the user's explicit approval):

"<user name> has contributed to the success of <artistist name here> by editing his profile." Of course there is a link to the artist's TMG profile, and also to the Facebook Page or Group for the artist, if there is one.

"<user name> has reached the milestone of 1,000 downstream play-throughs for the track <track name>". The track is made available in a Flash player in the stream, or by a link. Multiple such events can be posted for a particular track as different milestones (When there is enough critical mass to elicit direct artist involvement:) "<user name> is thanked by <artist name> for adding useful information to his TMG Profile." In preferred embodiments the artist clicks something to generate this message. Links to the artist's Facebook Page or Group and TMG Profile would be included. Most users would obviously love to be able to show off such direct acknowledgement from an artist. Also, preferred embodiments include space for the artist to optionally include a personal message of thanks. Additionally, some include a player for all the artist's free tracks, or a link to one.

Posting such events to a user's stream is a way for the user to show that he's making a contribution; many people will enjoy letting their friends know how they've been contributing to the music world.

Artist Pages and Artist-Oriented Groups

Facebook has two kinds of artist-oriented areas. The first is an artist "Page," which must be created by an official representative of the artist. The other is an artist-oriented "Group"
which can be created and administered by anyone who wants to. For instance, if you search for Leonard Cohen on Facebook, you'll find a Page (as well as a couple of Groups); if you search for jazz guitarist Ralph Towner, you'll only find a Group.

Both types of areas can be joined by anyone, and have Walls that anyone can write on. This fact provides enormous opportunities for virality, but services must be careful. If embodiments wrote on the walls for the Pages and Groups for large numbers of artists, we would almost certainly be picked up as a source of spam by Facebook's spam-detecting software, and banned from further posts (and the service's application could be banned as well).

Instead of directly writing on these Walls, sponsoring companies need to motivate tastemakers to do it for them. For instance, the Tastemaker Mode UI has an area where the artist's primary Facebook area is listed. In cases where it is not yet in the profile, preferred embodiments encourage the tastemaker to add it to the list; but where there isn't yet any Page or Group for the artist, some embodiments encourage the Tastemaker to add a group.

Facebook Opportunities

Facebook applications can appear as Profile Tabs and/or Profile Boxes. A service can also have external Web-based applications that interoperate with Facebook via Facebook Connect. Native Facebook applications have advantages, but in order to release TMG quicker, it may be wise to release a Facebook Connect-powered Web application first.

Profile Boxes

Profile Boxes appear on the left side of the user's Profile and can contain content such as music. A TMG Profile Box could also contain information such as the user's number of downstream play-throughs, TMG artist profiles he has edited, etc.

A Minimal Version for Day 1 Launch

Here is a list of elements some embodiments include as a minimal starting-point at initial launch to lessen time-to-market. Various embodiments can include various subsets or supersets of these elements.

A simple radio-like music player, including an area to type in one or more seed artists.

Basic Mode UI. This involves a degree of AJAX to show live information such as play-through counts.

Tastemaker Mode UI, sans user-written reviews. Again, this involves some AJAX.

Techniques to deal with simultaneous edits.

Techniques for determining tracks to be played in the radio based on the listener's typed-in artists, combined with the existing active taste profiles for each track.

Techniques for calculating scores, including distinguishing when there is enough statistical evidence that an edit has actually improved the performance of a track profile (at which time points are awarded).

Techniques for calculating that a track profile has been superseded with a better-performing one, so that it is made inactive.

Techniques for determining and awarding prizes—this can mostly be done manually in some embodiments, and so involves little programming for an initial version of a service.

Variations

Logarithm-Based Scoring

For the track (or artist) currently under consideration, the number of points available may be a multiple of −log(the number of times the track has been played in the game/the total number of plays the game has facilitated) or similar numbers, which may come from external sources; for example −log(the number of hits for the track returned by a search engine such as Google/the average number of hits returned by [at least] fairly well-known tracks on that search engine). Other examples: log(the total of all points earned for tracks/the number of points already earned in TMG by the track); the same calculation but for artists instead of tracks.

The key is that we are using the log of a ratio that serves as a representative of the current popularity of an artist or track, either in the context of the Game or outside of it. Also a weighted average of multiple such logs could be used. It must not be construed that the invention is limited to the quantities described in this specification.

In some embodiments points can be converted to money. In others, a certain threshold must be reached before points are awarded. For instance, a certain number of plays must be attained within the Game, or a certain popularity must be attained outside the game but subsequent to tastemakers working with the track or artist in the game. At that point, points, or a proportional amount of money, are awarded based on the popularity-related log that was computed earlier in the game process (for instance, an external measure of popularity can be used before the track or artist is even used in a game).

In some such embodiments, all the prize money for the track or artist in question goes to the one who earned the most points relative to that track or artist; in others, it is divided evenly or unevenly between the top few, or even one or more randomly-chosen tastemakers who engaged with the track or artist.

Alternate Bases for Points

A number of target users may be selected either out of the entire population, or the active tastemakers, or some variation. They are selected based on the calculated likelihood that the target users will like the track or, in some embodiments, the artist. (This is not necessarily a mathematically-rigorous "likelihood," but rather a quantity that is correlated with the probability that the track or artist will be liked.)

Liking may be indicated by a general user playing the track all the way through, or by a tastemaker choosing to "forward" the track or artist. Forwarding, in this case, means making the track available to the radios of other tastemakers where they, too, may forward the track/artist. For security (and possibly other) reasons, in some embodiments there is random element in the target user selection, so that it isn't necessarily the case that the users that have the greatest likelihood of liking the track will be selected, but the selections are still correlated with that liking.

Then, the tastemaker is award a number of points for each target user who likes the track. They may not always be the same number of points; for instance, some embodiments may award more points for target users with the greatest likelihood of liking the track or artist.

The points may be based on the logarithmic computations mentioned above, they may be fixed, or other bases may be used for assigning points. In any case, the user is made aware of the number of points available to him before indicating whether he likes the track.

Tastemakers have the option of adding tags or other information, such as text track and artist descriptions, before indicating that they like a track. This information may then be used to more accurately choose the target users; this gives the tastemaker an opportunity to increase his chances for earning points.

In some embodiments, it is acceptable for tastemakers to forward a track without indicating that they, personally like it, if they believe that target users will. User interface means are provided to indicate a forwarding and/or liking.

Miscellaneous

The descriptions in this specification are for exemplary purposes, and people of ordinary skill in the art will readily see variant ways of embodying the material that fall within the scope. The invention could not be construed to be limited to the specific embodiments described herein.

FAQ

QUESTION: Why is it based on a radio model?

Internet radios based on the user typing in one or more sample artists is by far the most successful freestanding Internet music paradigm. Pandora, last.fm, Jango (which grew virally to 1 million users 3 months after its launch in 2008), and other services are all based on it. So the radio model is proven, and may be the only freestanding music-based model that can command a user base of many millions of users. (By freestanding, we mean that it can be the basis of a service that is not merely an adjunct to an online store, as recommendation services tend to be.)

So TMG uses the well-proven radio paradigm, but, instead of competing, transmute it into a new sphere that is fundamentally different. It's different because TMG is a game and because it eschews the royalty-based music that is the foundation for every other Internet radio service. But to casual users, in preferred it's abpit as familiar as Pandora; only those who want to play TMG will get significant exposure to the fact that the invention has more under the surface.

Also, a radio is a great way for getting a series of tracks in front of tastemakers, whose profiles they can edit; they can be in passive listening mode until one comes along that seems like a particularly good opportunity for gaining points by editing.

QUESTION: What are the rating levels?

Many web sites use a 2-level (thumbs-up/thumbs-down) approach because they want to make everything as effortless as possible for the user; deciding between 4 and 3 starts out of 5 takes more effort then a simple thumbs-up or down. In TMG, however, players are motivated to make more effort because that's how they win. Various embodiments use different approaches. QUESTION: Do ratings represent the tastemaker's personal tastes, or should they try to predict the ratings others will give?

The idea will be for Tastemakers to try to assign a rating for the track that represents their personal tastes.

Of course, a tastemaker may hear a track that he doesn't like, but thinks could be liked by people whose preferences fall towards other kinds of music. He should not take that into account. This is because ratings will be used by the recommendation engine to route tracks. We don't want to route a track that the current user doesn't like to other people who share his tastes.

If the user interface displays a rating for the item in the radio player, it will be a rating derived from tastemakers whose tastes are consistent with the current set of typed-in-artists.

The invention claimed is:

1. A system for gathering ratings of items of entertainment works, from raters who are skilled at predicting community opinion, said system including a network of computers, each computer having a central processing unit and a memory, said system comprising:
   a) at least one server computer having a central processing unit and a memory, wherein said server computer is connected to the network;
   b) a plurality of client computers each having a central processing unit and a memory, said client computers serving one or more rating users;

c) the memory of at least one said computer in the network of computers containing a plurality of rating user data sets, each rating user data set representing the tastes of one of said rating users;
d) the memory of at least one said computer in the network of computers containing an item description data set, wherein said item description data set describes taste data for an item;
e) the memory of at least one said server computer containing computer-executable instructions for carrying out a search process which selects a group of chosen users, consisting of a subset of said rating users, based on the degree of similarity of each user's said rating user data set to said item description data set and each of said rating users' reliability of predicting community opinion;
f) the memory of at least one said computer in the network of computers containing an input data set by which a promoting user indicates a desire to pay at least one of said chosen users to review said item, wherein said promoting user is not enabled to discover at least one from the group consisting of the ratings previously produced by at least one of said rating users and information that could enable said promoting user to communicate with at least one of said rating users;
g) an output screen connected to a computer connected to the network, said output screen enabling rating users to learn they have received an offer of compensation in return for rating said item;
h) transfer means to send said item to said rating users;
i) an input screen connected to a computer connected to the network, said input screen and computer being adapted to enable each of said chosen users to input a rating; and
j) the memory of least one said server computer containing computer-executable instructions for operating a recommender system which generates a recommendation for said item based at least in part on said ratings.

2. The system of claim 1 wherein said input screen and computer of part i) are adapted to enable each of said chosen users to additionally enter a review.

\* \* \* \* \*